Patented Jan. 19, 1926.

1,570,169

UNITED STATES PATENT OFFICE.

MARK W. NELSON, OF LINCOLN, AND WALTER F. NELSON, OF COLLEGE VIEW, NEBRASKA.

PLASTIC COMPOSITION, A PUTTY OR A FILLER CEMENT.

No Drawing.   Application filed January 9, 1925.  Serial No. 1,481.

*To all whom it may concern:*

Be it known that we, MARK W. NELSON and WALTER F. NELSON, citizens of the United States, residing at Lincoln and College View, respectively, in the county of Lancaster and State of Nebraska, have invented a new and useful Plastic Composition, a Putty or a Filler Cement, of which the following is a specification.

The object of our invention, is a production of a plastic composition or putty to be applied to window sash, at the place where the wood and glass meet, to make a tight joint, impervious to water, dust, air, and to produce a putty that is cohesive in nature, and tenacious to wood, glass, metal and plaster.

To produce a putty or a filler cement, that sets quicker and more durable, than the "whiting linseed oil putty" which is now in use.

To produce a plastic composition, a putty or a filler cement, in preparation of previous painted wood, rough or smooth plastered walls, where the hard coat or paint has chipped, peeled or scaled off, to build it up and to make it like the adjoining surface, and to produce a permanent desirable foundation for paint.

Our composition consists of plaster of Paris, litharge, (lead monoxide) and for a cementing substance, floor or coach varnish.

In preparing the composition, we prefer to use the ingredients in the following proportions, eleven to fourteen pounds of plaster of Paris, three to five ounces of litharge, (lead monoxide) and two quarts of varnish, these ingredients to be mixed to a thick paste consistency, litharge may be omitted and still possess the qualities of being cohesive and tenacious.

Our composition is plastic, adheres without cracking when it dries to the surface to which it is applied, is tenacious to wood and glass, paint, metal, and plaster, possesses in a high degree all the desired properties of a putty or a filler cement.

We claim:

1. A plastic composition, adapted to form a putty or a filler cement, for window sash, the joint where the glass and the wood meet, to produce an impervious joint to water, dust, air and the like, comprising of eleven to fourteen pounds of plaster of Paris, three to five ounces of litharge, and for a cementing substance, two quarts of varnish.

2. A plastic composition or cement, adapted to form a tenacious, durable hard putty for window sash, comprising of eleven to fourteen pounds of plaster of Paris, and for a cementing substance, two quarts of varnish.

3. A plastic composition, consisting of twelve pounds of plaster of Paris, four ounces of litharge, and two quarts of varnish.

MARK W. NELSON.
WALTER F. NELSON.